Dec. 30, 1924.
H. H. LINN
CREEPER
Filed July 30, 1921
1,521,454
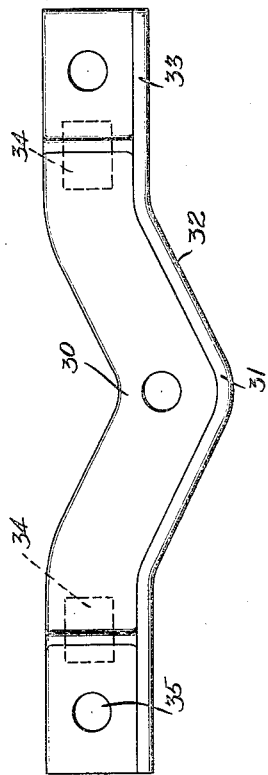
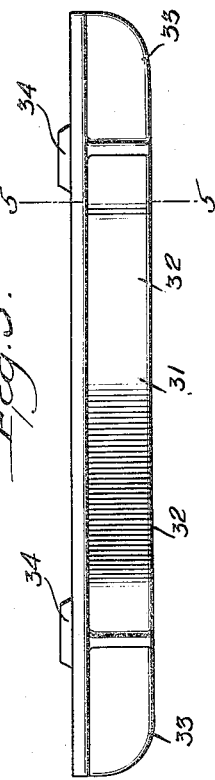
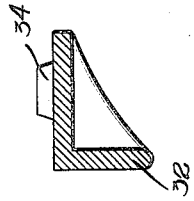
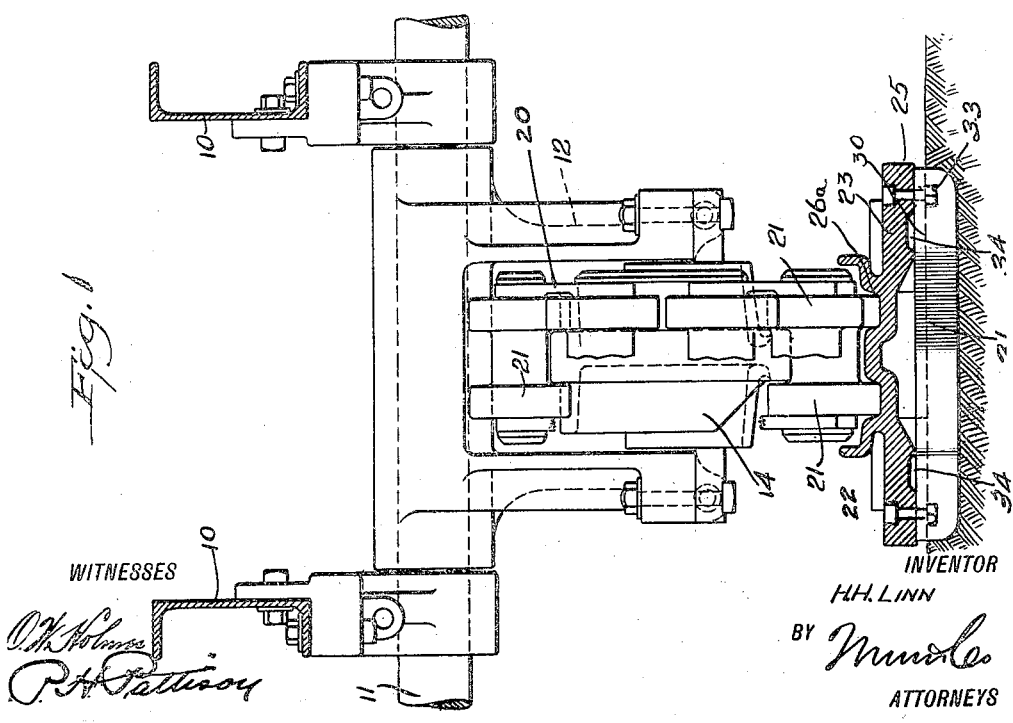
WITNESSES
INVENTOR
H.H. LINN
BY
ATTORNEYS Patented Dec. 30, 1924.

1,521,454

UNITED STATES PATENT OFFICE.

HOLMAN HARRY LINN, OF MORRIS, NEW YORK.

CREEPER.

Application filed July 30, 1921. Serial No. 488,664.

*To all whom it may concern:*

Be it known that I, HOLMAN H. LINN, a citizen of the United States, and a resident of Morris, in the county of Otsego and State of New York, have invented a new and Improved Creeper, of which the following is a full, clear, and exact description.

The present invention relates to new and useful improvements in tractors and it pertains more particularly to creepers therefor.

It is one of the objects of the present invention to provide a creeper for tractors in which the tendency for collecting and packing mud, dirt, snow, ice, and the like, is reduced to a minimum.

It is a further object of the invention to so construct the creeper that side slipping or skidding is greatly reduced.

It is a further object of the invention to so construct a creeper for tractors that the entire traction surface of the creeper engages the surface over which the tractor is traveling, the engagement of the creeper section being continuous throughout the contacting surface of the creeper.

With the above and other objects in view, reference is had to the accompanying drawings, in which—

Fig. 1 is an end elevation partly in section;

Fig. 2 is a bottom plan view of the creeper section;

Fig. 3 is a side elevation thereof;

Fig. 4 is a detail section view taken on the line 5—5 of Fig. 3.

Referring more particularly to the drawings, the reference character 10 designates the side frames of the tractor, and carried thereby is a shaft 11. Depending from the shaft 11, is a yoke 12 and pivotally mounted in the yoke 12, as at 13, is a truck 14 of the tractor. Extending around this truck is a chain, and said chain comprises a plurality of links 20, between which are mounted supporting rollers 21.

The reference character 22 designates the track or lag of the tractor, and said track or lag is composed of a plurality of links pivotally secured together. Each of these links 23 is formed with a depending lug 25 and these depending lugs 25 are recessed as indicated by the reference character 26. Each of the links 23 is provided upon its upper surface with a track 26ª in which the rollers 21 heretofore mentioned are adapted to run.

Each cleat 30 consists of a bar having right angular members, the central portion of which is substantially V-shaped, with the ends extended perpendicularly to the principal axis in the same plane as the V portion, as clearly seen in Figs. 2 and 3. The reference character 31 designates the V or entrant portion of the cleat, and from this point the gripping edge diverges rearwardly as indicated by the reference character 32, and near the ends of the cleat the gripping edges are extended in a plane transverse of the lag or track as indicated at 33. The members of the bar adjacent the ends of the bar are connected by ribs *x*.

Each of the cleats is provided on its rear face with lugs 34 adapted to be received within the recesses 26 to prevent shifting of the cleat relatively to the lag or track 22. The cleats 30 are each provided with openings 35, there being one opening near each end and one opening intermediate the two ends in the V portion thereof, said openings adapted to receive bolts or the like 36, by means of which the cleats are secured to their respective links, nuts 37 being employed for this purpose.

The device operates in the following manner:

Upon movement of the tractor, the lag or track 22 is laid, and as the same is laid beneath the truck 14, it will be seen that the apex of the V portion will be the first to engage the surface over which the tractor is traveling. When the creeper has reached the position shown in Fig. 1, the entire gripping surface thereof will be engaged with the surface over which the tractor is travelling in order that a maximum gripping action with respect to said surface may be had.

From the foregoing it will be apparent that as the cleats engage the surface over which the tractor is traveling, the apex of the V will be the first to engage said surface, and owing to its wedge-shaped structure, will more readily grip the surface. It is also apparent that as the cleats pass beneath the trucks 14, both legs of the V-shaped member will be engaged with the surface and thus greatly add to the gripping qualities of the track.

When the gripping edge of the cleat is sharpened by grinding, the same provides a gripping element particularly well adapted for use on ice, since owing to the diverging legs of the cleat, side slipping or skidding is reduced to a minimum.

I claim:

In a tractor, a track comprising a plurality of hinged creeper sections, each having a depending member provided with recesses, a cleat for each creeper section, said cleat comprising right angular members having a substantially V-shaped central portion, the members of the bar having flat outer faces and connected by ribs adjacent the ends of the bar, one member being provided at the middle and at its ends with openings and adjacent its ends with lugs, the member of the cleat with the openings engaging the depending member of the creeper section with its lugs in the recesses thereof, and bolts passing through the openings of said cleat member into the depending creeper section member.

HOLMAN HARRY LINN.